Figure 1:
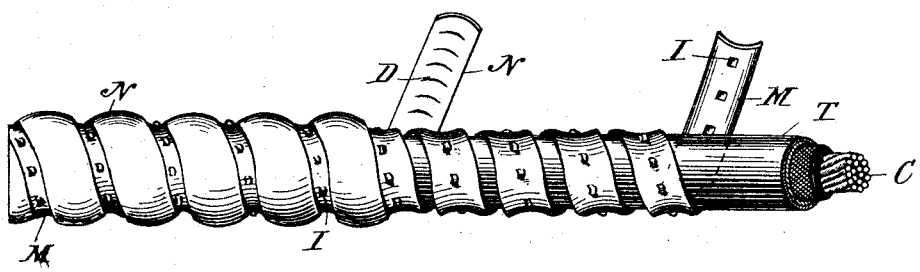

No. 616,612. Patented Dec. 27, 1898.
E. T. GREENFIELD.
ARMORED ELECTRIC CABLE.
(Application filed Apr. 13, 1898.)

(No Model.)

Witnesses
Edward C. Rowland
M. M. Robinson

Inventor
Edwin T. Greenfield
By his Attorney
Charles J. Kintner

THE NORRIS PETERS CO., PHOTO-LITHO., WASHINGTON, D. C.

UNITED STATES PATENT OFFICE.

EDWIN T. GREENFIELD, OF NEW YORK, N. Y.

ARMORED ELECTRIC CABLE.

SPECIFICATION forming part of Letters Patent No. 616,612, dated December 27, 1898.

Application filed April 13, 1898. Serial No. 677,447. (No model.)

*To all whom it may concern:*

Be it known that I, EDWIN T. GREENFIELD, a citizen of the United States, residing at New York, in the county of New York and State of New York, have made a new and useful Invention in Armored Electric Cables, of which the following is a specification.

My invention is directed particularly to improvements in electric cables designed for ocean service, and has for its objects, first, to devise an armored cable of such a nature that the insulation of the cable will be thoroughly protected from the attacks of borers or other insects or animals which usually attack cables of this nature when sunk in the body of the ocean; second, to devise an armored cable of such a nature that its exterior armor will fully protect it (the cable) from unnatural wear when it is suspended over ledges of rock in the body of the ocean; third, to provide a cable of the nature indicated in which the armor is of steel, phosphor-bronze, or any preferred metal having the desired strength and qualities for adapting it for use in the ocean and in making such armor of a flexible nature, so that the completed cable may be wound upon a drum in the usual way when it is desired to lay it in the bed of the ocean, and, fourth, to provide a lead or equivalent covered cable with a flexible protecting armor which will protect the lead covering from the action of metal slivers when drawn into a conduit.

My invention will be fully understood by referring to the drawings, in which—

Figure 2:
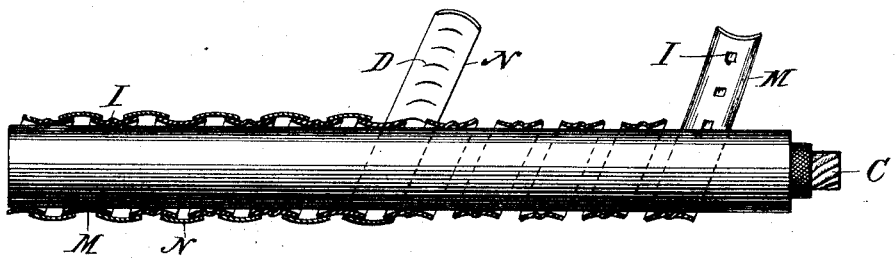
Figure 3:
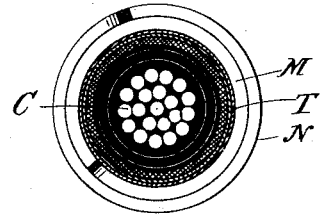
Figure 4:
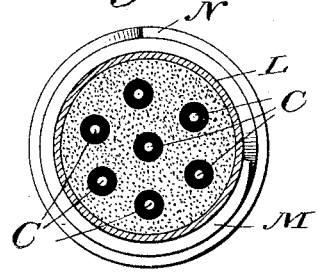

Figure 1 illustrates in side elevational view a short length of my improved flexible armored cable, illustrating also the manner of constructing the same; and Fig. 2 is a part longitudinal sectional view of Fig. 1, Fig. 3 being an enlarged end elevational view of the structure as seen looking at Fig. 1 from the left of the drawing toward the right. Fig. 4 is an end elevational view of an armored lead-covered cable constructed in accordance with my invention and embracing a number of independent insulated conductors.

Prior to my invention ocean-cables and armored conductors generally had been made in which a strip of metal constituting the armor had been wound spirally around the cable in such manner as to form a protecting casing or coating; but no one, so far as I am aware, had constructed an armored cable of the nature indicated in which the armor was made of one or more spirally-wound strips of metal so interlocked in its windings as to make the armor flexible and also to prevent the rupturing of the armor at any point by bending the cable to ordinary degrees of curvature, and in this feature lies the essential novelty of my invention.

Referring now to the drawings in detail, C represents the conducting core or cable proper, which is of the usual form, consisting of a number of copper conductors, twisted as shown, and T the insulation around such cable, the same being of such material and arrangement as is customary in the construction of ocean-cables, and needs, therefore, no special description here, it only being important that this insulation be of such a nature as to effectually protect the interior core or conductor C, which latter may be as shown, or a single conductor or a number of individual conductors separated from each other by definite spaces, as is often the case in connection with cables where it is desired to assemble a series of independent conductors within one cable.

N and M represent spirally-wound strips of metal, preferably of Bessemer steel, although they may be of any metal having the desired strength and flexibility and not readily attacked by salt water—such, for instance, as any of the well-known metallic bronzes, like phosphor-bronze, or such as will readily suggest themselves to the maker. The inner strip M is so constructed that when wound upon the outer surface of the insulation T it presents an outward concave or curvilinear surface throughout its length and is also provided with a central line or row of projections or lugs I I, while the outer strip N, which is wound upon it in such manner as to break joints, is curved in a reverse direction or inwardly and has constructed upon its inner surface a series of lateral indentations D. These two strips are wound about the insulation T of the cable in the manner shown, so that they break joints and that the outwardly-extending row of projections I is located between the windings of the strip N, and it will be noticed that by virtue of their opposite curvature and the intervening row of projections or lugs I there is formed a continuous locking-joint between all of the parts of the armor, such locking-joint preventing the unwinding of the end portions thereof and also any possibility of separating the several convolutions by any reasonable longitudinal strain upon the completed cable. It will also be apparent that by virtue of the reverse curvature of these two strips N and M when in position there is given great flexibility to the entire structure, so that it may be bent to almost any degree of curvature, therefore adapting it to be wound upon a drum or drums, as cables are ordinarily wound and placed on shipboard prior to laying them. It will be understood that the projections or lugs I might be replaced by a continuous longitudinal ridge or rib; but I find that better results are obtained by the use of such lugs. It is also apparent that there might be a series of such inwardly-projecting lugs in the strip M for giving further interlocking capability to the entire structure. It is also obvious that there might be more than two layers of spirally-wound armor-strips, if desired; but I find that two such strips, when constructed as hereinbefore described, give ample protection to the insulation and sufficient strength to the structure for all practical purposes.

In Fig. 4 I have shown in end elevational view a well-known form of lead-covered cable, such as is used in telephonic service, and provided with my novel form of flexible armor, C C' representing a definite number of independent insulated telephonic conductors and L the lead or equivalent yielding metallic covering of the entire cable, the armored strips N and M surrounding said covering.

I do not limit myself in the construction of metallic armored electric cables of the type indicated to an armor of two metallic strips of the curvilinear structure shown, but wish it understood that my claims hereinafter made are designed to be of such scope as to include two or more metallic strips oppositely curved or bent in such manner that their adjoining edges will act to interlock and firmly hold the entire armor in position around the outer insulation of the cable itself; nor do I limit myself to the use of the hereinbefore-described armored electric cable to ocean service, as the same may be used in any place where it is found necessary to furnish an armored protection to such cables—as, for instance, in connection with electric-light and power systems, where it is desired to convey high-potential currents through districts of service which might render the use of ordinary conductors dangerous, my armored cable giving a sufficient protection from the attacks of all extraneous sources to render it reasonably safe.

My novel form of flexible armor makes it also possible to thoroughly protect the well-known form of lead-covered cables now used in telephony in conduits from the damaging effects of metal slivers during the time that such cables are being drawn into position within the conduits, and also affords an effective protection against damage during shipment, thereby rendering it absolutely certain that the cables will be in perfect condition after they are drawn into their permanent resting-places.

Having thus described my invention, what I claim, and desire to secure by Letters Patent of the United States, is—

1. A flexible armored electric cable consisting of an insulated conductor having two or more metallic armor-strips spirally wound thereon and curved in opposite directions, substantially as described.

2. A flexible armored electric cable consisting of an insulated conductor or core and two or more metallic armor-strips spirally wound thereon, said armor-strips being curved in opposite directions and breaking joints with each other, substantially as described.

3. A flexible armored electric cable consisting of a flexible insulated conductor and two or more metallic armor-strips spirally wound thereon, the armor-strips being curved in opposite directions and one of them provided with a centrally-located row of locking lugs or projections I, substantially as described.

4. A flexible armored electric cable consisting of one or more insulated conductors surrounded by a lead or equivalent yielding metallic covering, in combination with a flexible metallic armor consisting of two or more strips of metal spirally wound thereon and curved in opposite directions, substantially as described.

In testimony whereof I have hereunto subscribed my name this 11th day of April, 1898.

EDWIN T. GREENFIELD.

Witnesses:
 C. J. KINTNER,
 M. F. KEATING.